Oct. 20, 1936.  F. CIRELLI  2,058,132
SOUND BOX FOR AMPLIFYING HORNS WITH LOUDSPEAKERS
Filed April 6, 1934
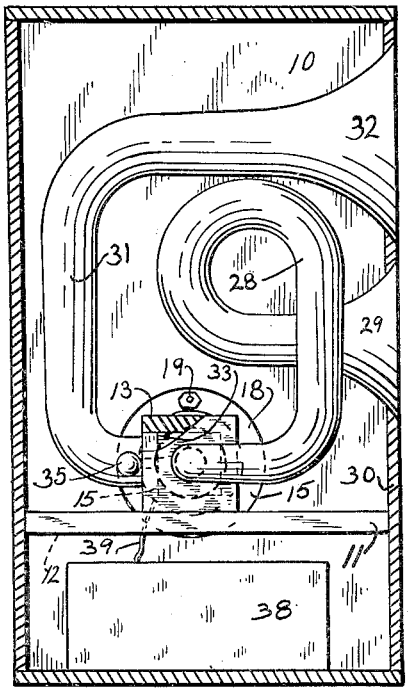
Fig. 1.
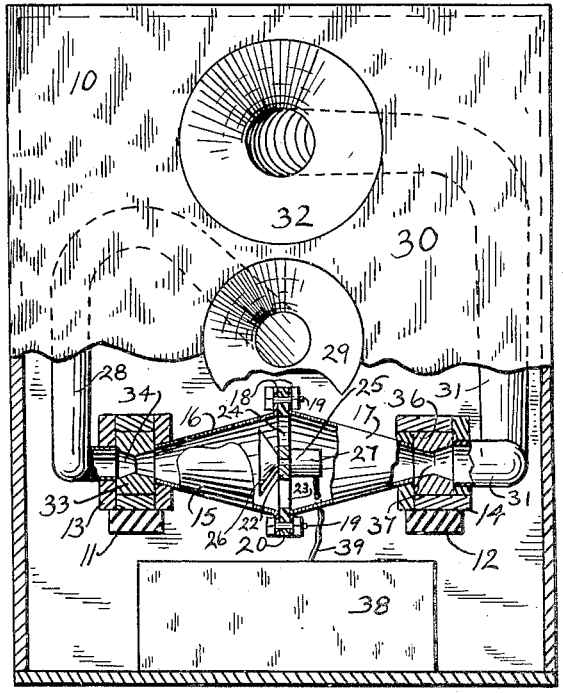
Fig. 2.
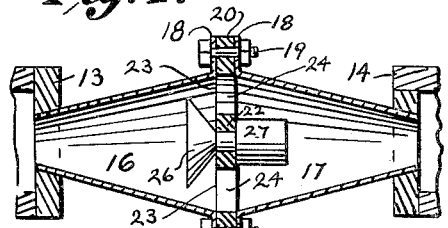
Fig. 3.
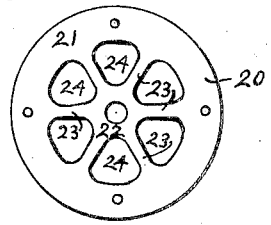
Fig. 4.
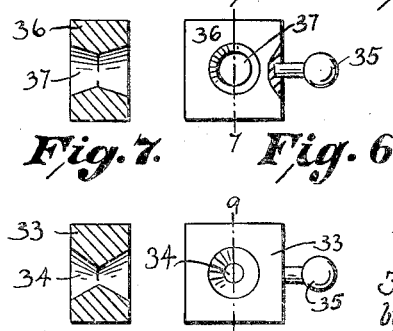
Fig. 5.  Fig. 7.  Fig. 6.  Fig. 9.  Fig. 8.
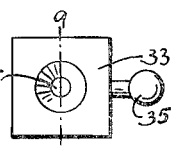
Inventor,
Frank Cirelli
by his attorney.
J. Edward Thebaud Patented Oct. 20, 1936

2,058,132

UNITED STATES PATENT OFFICE 2,058,132

SOUND BOX FOR AMPLIFYING HORNS WITH LOUDSPEAKERS

Frank Cirelli, Philadelphia, Pa.

Application April 6, 1934, Serial No. 719,309

7 Claims. (Cl. 181—27)

This invention relates to sound boxes for amplifying horns with loud speakers.

One of the objects of my invention is to provide a form of closure for a sound reproducer, connected with an amplifying horn, where the sound reproducer may be a loud speaker of a phonograph or of a radio. In connection with the above object I desire to provide a form of closure, such as to afford a government of the flow of sound waves in an unobstructed manner, with the least modification of the natural harmony and beauty of the sound and with the least loss thereof.

A further object of my invention is to provide a sound appliance having a sound box with a central portion, and conical portions radially extending therefrom in the direction of their convergence, with a sounding device positioned in said central portion to send sound waves into said conical portions, having a horn connected with each of said conical portions, the taper of each of said conical portions I desire to be comparatively slender, so as to lend such portion by such taper, to the easy, unobstructed and efficient carrying of sound waves into the horn connected with each conical portion.

Another object is to form the said closure as a double conical sound box, convergently tapered toward the ends, having the sound reproducer positioned within and midway of the ends and having the ends of the sound box connected with amplifying horns. I desire also to have the cones of sound box particularly shaped with long, comparatively slender tapers to assist the flow of the sound waves without interruption, which cones of short and comparatively blunt tapers would cause. By the use of a long slender tapered formation of cones, I desire to transmit a much greater volume of sound to the horns affording less wall obstruction, particularly to that part of the sound waves which come from the outer zone of the loud speaker, as a sound reproducer.

A further object of my invention is to take advantage of the selective tenor and base qualities afforded by a double long tapered conical sound box, permitting the use of a large horn and a smaller horn in connection therewith, with such a sound box, and in a measure giving in connection with such horns, distinct and separate amplifications to the tenor and to the base sounds, to further blend in an amplified manner as they leave the face of the cabinet, into which the large ends of the horns open.

Another object of my invention is to provide replaceable or changeable throat devices or blocks having throats of varying sizes, at the connections between the sound box and the horns, to determine the sound volume, as well as serve in the selection of the tenor and base notes, to be amplified by the respective horns.

Another object in using the long taper double cone loud speaker enclosure, is to obtain sharper and individual amplified tones in such volume as will carry the sound a much greater distance than with those now on the market.

With these and other objects, which will hereinafter appear, my invention resides in certain construction, one embodiment of which is illustrated in the drawing. The parts are described, their relation and operation are pointed out and what I claim is set forth.

In the drawing,

Figure 1 is a sectional side elevation of a sound cabinet enclosing a device which embodies my invention.

Figure 2 is a sectional front elevation of the sound cabinet and device shown in Figure 1.

Figure 3 is an enlarged sectional elevation of the double conical sound box and loud speaker shown in Figures 1 and 2.

Figure 4 is an elevation of the disc plate of the sound box.

Figure 5 is a perspective view of one of the throat blocks and its casing.

Figure 6 is a side elevation of a throat block with a large throat.

Figure 7 is a section taken on the line 7—7 of Figure 6.

Figure 8 is a side elevation of a throat block with a small throat.

Figure 9 is a section taken on the line 9—9 of Figure 8.

In the figures there is shown within the cabinet 10, two supporting cross bars 11 and 12, in the lower part of the cabinet. Upon the bars 11 and 12 are mounted the respective throat block casings 13 and 14, between the casings 13 and 14, is the double cone sound box 15, having two sheet metal long tapered cone portions 16 and 17, with flanges 18, fixed by bolts 19, to the open disc plate 20, having a rim 21, a hub 22 and spokes 23, affording open sound spaces 24, between the spokes 23. The taper of the wall of a cone portion is preferably of a less angle than forty-five degrees with the axis of the cone portion. Fixed to the hub 22, is the loud speaker 25, with its cone 26, shown spaced from the wall of the cone portion 16. 27 is the wire coil portion of the loud speaker 25. Fixed in the casing 13 is the small end of the smaller horn 28, having its bell-mouth 29 fixed in the front wall 30, of the cabinet 10. Fixed in the casing 14 is the small end of the larger horn 31, having its bell-mouth 32 fixed in the front wall 30, of the cabinet 10, above the horn mouth 32. In sliding engagement with the block casing 13 is the throat block 33, having a small apertured throat 34 and a pull knob 35. In sliding engagement with the block casing 14 is the throat block 36, having a larger apertured throat 37, with a pull knob 35. This throat block 36 is shown in Figures 6 and 7, while the throat block 33 is shown in Figures 8 and 9. Below the sound box 15 is shown another box 38, which contains the device, which operates the loud speaker 25, whether the device is an electric phonograph or a radio connected by the wire cable 39, with the loud speaker 25.

In operation, assume we have on hand a number of throat blocks, of varying throat sizes, two of which, 33 and 36, are shown. Assume also that we have positioned two such blocks as 33 and 36, in their respective casings 13 and 14. Then, with the loud speaker 25, actuated electrically, through connection, by cable 39, with the device (phonograph or radio) within the box 38, the sound waves coming from the cone 26, of the loud speaker 25, will pass longitudinally within the sound box 15, in opposite directions, some sound waves passing to the right through the openings or spaces 24, in the disc plate 20, and through the cone portion 17, the throat 37, of the throat block 36, into the horn 31, and out of its bell-mouth 32, at the front wall of the cabinet 10, while other sound waves will pass to the left, from the cone 26, through the cone portion 16, the throat 34, and into the smaller horn 28, and out of its bell-mouth 29, below the bell-mouth 32, of the horn 31, at the front wall of the cabinet 10. The throat 37, of the block 36, being large, will favor the transmission of the tenor tones, while the smaller throat 34, of the block 33, will favor the transmission of the base tones. Tenor tones and base tones thus being separately amplified by the horns, 31 and 28 respectively, to blend in amplified relation as they leave the respective bell-mouths 32 and 29 in the room in which the cabinet 10 is situated. A variety of sound effects can be had according to the sizes of throat selected when positioning the throat blocks. If desired, given sizes of throat connections, between the horns and the sound box, can be built fixed in place, dispensing with the replaceable feature of the throat blocks to simplify the construction, once the desired throat sizes have been determined for a general given sound effect coming from the cabinet 10.

In the operation of my invention as a sound appliance, I find that the long sloping taper to the cone portions 16 and 17, of the sound box 15, materially improves the volume of sound, as well as the sharpness of the musical notes, as they come clean cut and distinct from the amplifying horns, thus preserving their natural characteristics, and eliminating much of the modifications and echos attending the use of sound channels, having the walls standing at a sharper angle to the line of sound travel, showing the importance of having the angle of taper of the cone portions 16 and 17, as small as possible, consistent with the practical construction of the sound device within a given cabinet.

While I have shown and described one embodiment of my invention, various changes can be made, yet coming within the spirit and scope of my invention, I therefore wish to include all such changes and forms which come within the purview of the claims.

I claim:

1. In a sound appliance having a sound box, two amplifying horns connected with said sound box and a loud speaker within the mid-portion of said sound box, two slender abutting conical portions to said sound box, each tapering convergently away from the abutment of said portions and at a tapering angle which is less than forty-five degrees with the axis of the tapered portion in each of said portions respectively, said horns being connected with said sound box at the small convergent ends thereof.

2. In a sound appliance having an amplifying horn, a sound box, a connecting casing between said horn and said box, and a loud speaker within said sound box, a throat block releasably fitting into said connecting casing to be positioned therein to pass sound waves traveling from said speaker to said horn, whereby permitting the substitution of one block having a given size throat, for another like block having a different sized throat.

3. A sound appliance including in combination, a cabinet, a front wall to said cabinet, two amplifying horns, differing in size, within said cabinet having the mouths of said horns opening at said front wall, a double conical sound box connecting the small ends of said horns, said sound box being convergently tapered toward the horn connections, a sound transmitting partition positioned across said sound box, and across the axis line of its conical portions, and substantially at the junction of its tapered portions, a loud speaker within said sound box next to said portion, each of the conical portions of said sound box being tapered at an angle of less than forty-five degrees with its axis.

4. In a sound appliance, having two amplifying horns, and a loud speaker, a sound box connecting said horns, having two co-axial tapered portions convergently extending toward the connections with said horns, and a partition member between said tapered portions at their large ends next to said loud speaker, said member being apertured for the transmission of sound therethrough.

5. In a sound appliance, having two amplifying horns and a loud speaker, a sound box connecting said horns, having two abutting tapered portions, said tapered portions convergently extending toward the connections with said horns, and a sound transmitting partition between said tapered portions, at their large ends and positioned transverse to the center lines of said tapered portions, said loud speaker being positioned next to said partition.

6. In a sound appliance having a plurality of amplifying horns and a sounding device, a sound box, a main portion to said sound box, tapered portions to said sound box extending convergently from said main portion of said sound box, each of said tapered portions being connected at its small end with one of said horns, and a supporting member in said main portion positioned therein to support said sounding device relative to the said conical portions, to have the sound waves coming from said device enter said conical portions, individually, said supporting member being apertured for the transmission of sound therethrough.

7. In a sound appliance having a plurality of amplifying horns and a sounding device, a sound box, having said device therein, a main portion to said sound box, tapered portions to said sound box, extending convergently from the main portion of said sound box, each of said tapering portions being connected at its small end with one of said horns, and a sound transmitting supporting member in said main portion, positioned therein to support said sounding device in said main portion, relative to the said conical portions, individually, to have sound waves, coming from said device enter each of said conical portions.

FRANK CIRELLI.